United States Patent [19]

Rosenbalm et al.

[11] Patent Number: 5,056,302
[45] Date of Patent: Oct. 15, 1991

[54] MOWER-CONDITIONER DRIVE SYSTEM

[75] Inventors: Allan W. Rosenbalm; James C. Walters, both of Ottumwa, Iowa

[73] Assignee: Deere & Company, Moline, Ill.

[21] Appl. No.: 534,999

[22] Filed: Jun. 8, 1990

[51] Int. Cl.$^5$ ............................................. A01D 69/08
[52] U.S. Cl. ..................... 56/10.3; 56/11.5; 56/11.7; 56/14.1; 56/16.4; 192/56 R
[58] Field of Search ..................... 56/10.3, 11.3, 11.4, 56/11.5, 11.7, 13.5, 14.1, 14.4, 14.5, 16.4; 192/56 R

[56] References Cited

U.S. PATENT DOCUMENTS

| | | | |
|---|---|---|---|
| 3,555,791 | 1/1971 | McCarty et al. | 56/14.4 X |
| 3,698,162 | 10/1972 | Scarnato et al. | 56/14.4 X |
| 3,729,907 | 5/1973 | Burrough et al. | 56/14.1 |
| 3,820,311 | 6/1974 | Sawyer et al. | 56/14.4 |
| 4,127,981 | 12/1978 | Parrish et al. | 56/14.4 |
| 4,182,099 | 1/1980 | Davis et al. | 56/16.4 |
| 4,184,314 | 1/1980 | Hobbs | 56/10.3 X |
| 4,617,003 | 10/1986 | Bober et al. | 192/56 R X |
| 4,866,918 | 9/1989 | Engelstad et al. | 56/10.3 |

OTHER PUBLICATIONS

John Deere Operator's Manual, 1217 and 1219 Mower-Conditioners, Ottumwa Works OM-E69276 Issue H2.

Primary Examiner—Hoang C. Dang

[57] ABSTRACT

A mower-conditioner drive system includes a main support casting having an outwardly projecting stub shaft and an inwardly projecting pivot pin mounted to an upright wall section at one end of a header frame. A slip clutch is received on the stub shaft and includes a main drive plate coupled to one shaft of an angle gear box and includes inner and outer pressure plates connected for being frictionally driven by the drive plate, the inner pressure plate having a main drive spur gear integral therewith and the outer pressure plate having a drive sheave integral therewith. The main drive spur gear forms part of a drive train for driving either a pair of conditioner rolls or for driving an impeller conditioner while the drive sheave is coupled by a belt for driving either a sickle-type cutterbar or a rotary type cutterbar. In the case where the mower-conditioner is equipped with conditioner rolls, the main drive gear is located on the pivot axis of a pair of arms carrying the upper roll for movement towards and away from the lower roll and with one of the pivot arms being mounted on said pivot pin. An angle gear box having a gear ratio between the two shafts thereof which makes it possible to reverse the box so that it delivers the same output speed regardless of whether a tractor PTO connected thereto has a speed of 540 rpm or 1000 rpm is releasably splined to the clutch drive plate.

14 Claims, 8 Drawing Sheets

MOWER-CONDITIONER DRIVE SYSTEM

BACKGROUND OF THE INVENTION

The present invention relates to crop harvesting machines for mowing a standing crop and for bruising the stems of the crop by feeding it between conditioner rolls or into engagement with a conditioning rotor, these machines being commonly called mower-conditioners (hereinafter often referred to as mocos); and, more particularly, the present invention relates to a drive system for such a machine.

The drive system for conveying power on a moco will vary with the type of moco. Specifically, a sickle moco, i.e., one that uses a sickle type cutterbar for severing crop from the ground, can have four powered elements, namely, a wobble box of the cutterbar, a reel, an upper conditioner roll and a lower conditioner roll. A rotary moco, i.e., one that uses a rotary disc type cutterbar for severing crop from the ground will either have two or three powered elements, e.g., a drive box of the cutterbar and an impeller conditioner, or a drive box of the cutterbar, an upper conditioner roll and a lower conditioner roll.

The upper and lower conditioner rolls of known mocos are usually driven by a gear train enclosed in a large, oil-containing gearbox and having counter-rotating output shafts respectively coupled to the upper and lower conditioner rolls by means of u-joint drive lines, the drive line to the upper conditioner roll being necessitated by the fact that the upper conditioner roll is mounted for moving vertically to accommodate varying crop volumes passing between the rolls. Although these drive lines are kept as short as possible, they increase the overall width of the machine. The drive lines also add cost and complexity to the machine and require periodic lubrication.

Impeller conditioners have a single powered rotor. It is common to provide the operator a choice of two rotor speeds to accommodate different crop types. This is done by transposing the driver and driven sheaves which have different diameters. This requires the drive speed to be mid-range of the two rotor speeds.

Two standard tractor power take-off speeds are available, these being 540 and 1000 rpm. Although 540 rpm is the most popular speed, 1000 rpm is preferred on high-powered implements such as rotary mocos. Traditionally, mocos are manufactured for a single PTO speed and can't be economically converted at the point of sale to the other speed. This causes increased inventory at the factory and adds an impediment to the sale.

An adjustable slip clutch is usually used in the main drive to prevent drive component damage due to high power consumption or lock-up. Because the clutch is usually a separate assembly which is not combined with other drive components, it adds cost to the mocos. Also, the slip clutch settings for 540 and 1000 rpm are not the same even though the moco may be the same. This causes user confusion and incorrect adjustment.

SUMMARY OF THE INVENTION

According to the present invention, there is provided an improved drive system for a mower-conditioner.

An object of the invention is to provide a mower-conditioner drive system which is generic in that it can be used on mocos equipped with either a sickle or rotary cutterbar and with either a pair of conditioner rolls or an impeller conditioner.

Another object of the invention is to provide a mower-conditioner drive system which is relatively narrow in width.

Yet another object of the invention is to provide a mower-conditioner drive system which incorporates a slip clutch coupled to a gear box having a 1.35:1 gear ratio between input and output shafts thereof such that the gear box can easily be reversed for receiving power from a tractor PTO operating at either 540 rpm or 1000 rpm while, in either case, delivering power at 735 rpm to the clutch.

Still another object of the invention is to provide a mower-conditioner drive system including a slip clutch which combines driving elements with the clutch pressure plates.

These and other objects are achievable by means of a drive system including a main support casting which is a common part for all mower conditioner versions, the casting rotatably supporting a slip clutch including drive and pressure plates, which respectively incorporate a main drive gear and a pulley sheave, and pressure applying clutch springs, the size of the pulley sheave and the number of springs being appropriately selected for transferring either a first amount of torque, as required for driving a sickle type cutterbar, or a second greater amount of torque as required for driving a rotary type cutterbar.

When the moco is one having conditioner rolls, the upper roll is mounted on a pair of arms which swing about the rotational axis of the main drive gear and an upper roll drive gear is carried by the roll and meshed with the main drive gear. An idler gear is rotatably carried by the main casting and is meshed with a lower roll drive gear carried by the lower roll.

When the moco is one having an impeller conditioner, inner and outer idler gears are carried by the main casting with the inner idler gear being meshed with the main drive gear and with the outer idler gear being meshed with an impeller gear carried by the impeller rotor shaft.

BRIEF DESCRIPTION OF THE DRAWINGS

FIG. 5 is a left side elevational view of an alternate reel drive.

DESCRIPTION OF THE PREFERRED EMBODIMENT

Preliminarily, it should be noted that in various places in the description below elements are described as being in pairs when only one of the pair is shown. Further, all terms such as as "right", "left", "front", "rear", ect. are made with reference to an observer standing behind and facing the machine.

Figure 1:
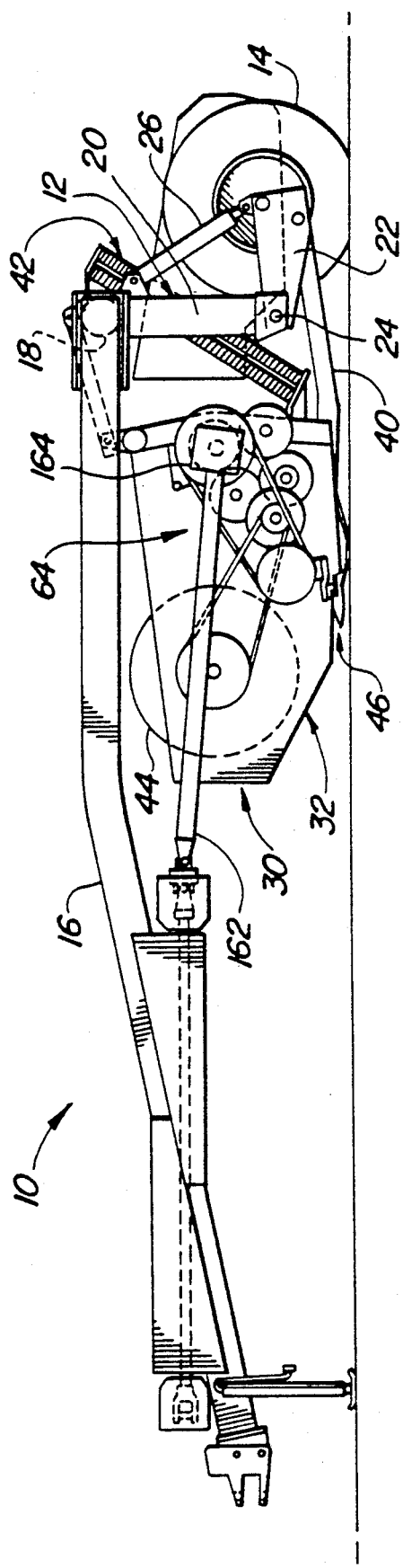
FIG. 1 is a left side elevational view showing a mower-conditioner equipped with a reel, a sickle type cutterbar, and conditioner rolls together with a drive system therefor constructed in accordance with the principles of the present invention.

Referring now to FIG. 1, there is shown a mower-conditioner 10 of a towed type including a main frame 12 supported on a pair of ground wheels 14 and having a draft tongue 16 coupled to an upper left location thereof. The frame 12 includes a tubular cross member 18 joined to depending legs 20 and the wheels 14 are respectively mounted to the rear ends of a pair of trailing wheel support arms 22 which are respectively pivotally mounted, as at 24, to the legs 20. Coupled between each of the legs 20 and a respective arm 22 is an extensible and retractable hydraulic cylinder 26 for selectively pivoting the arms so as to adjust the height of the frame relative to the ground.

Figure 2:
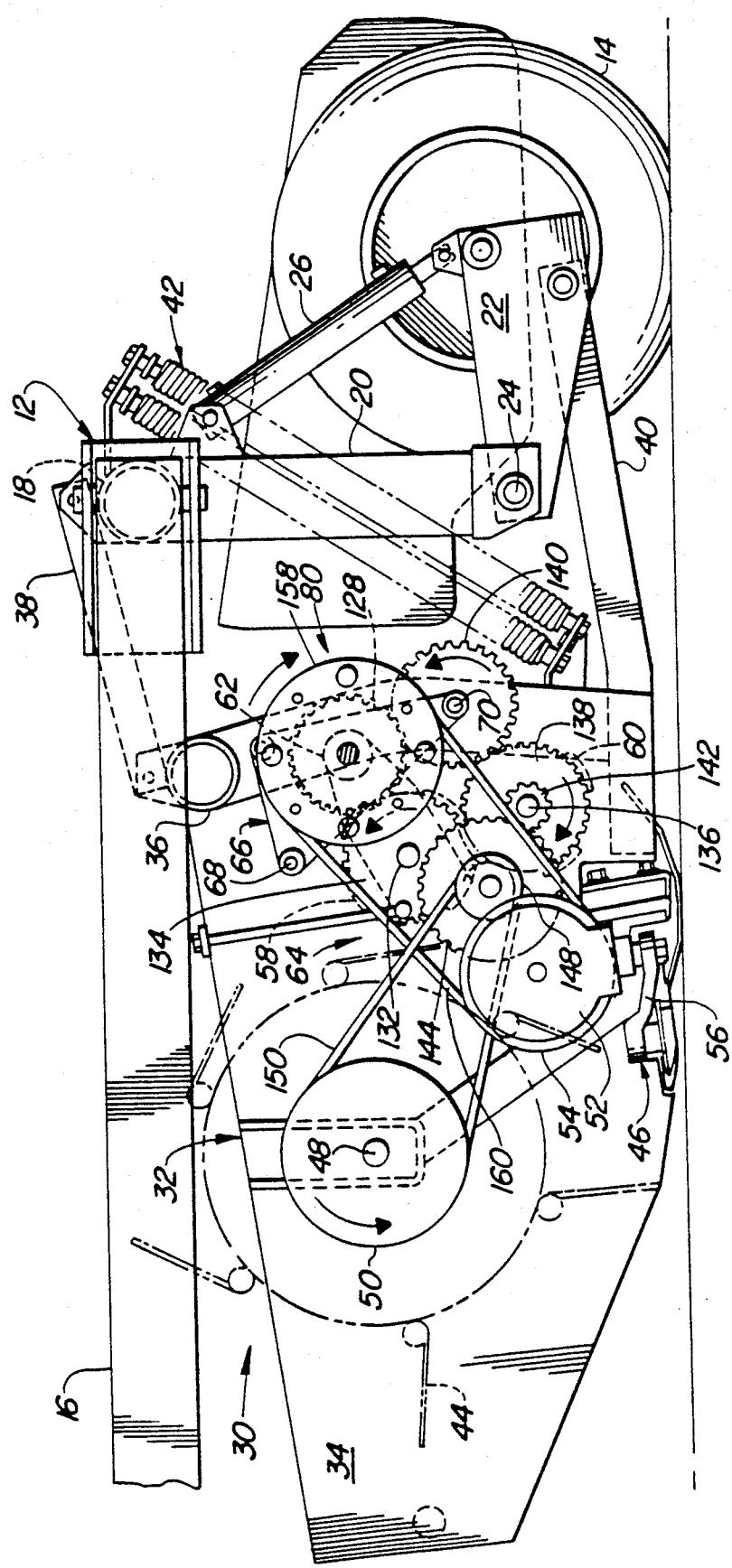
FIG. 2 is an enlarged left side elevational view of the drive system shown in FIG. 1.
Figure 3:
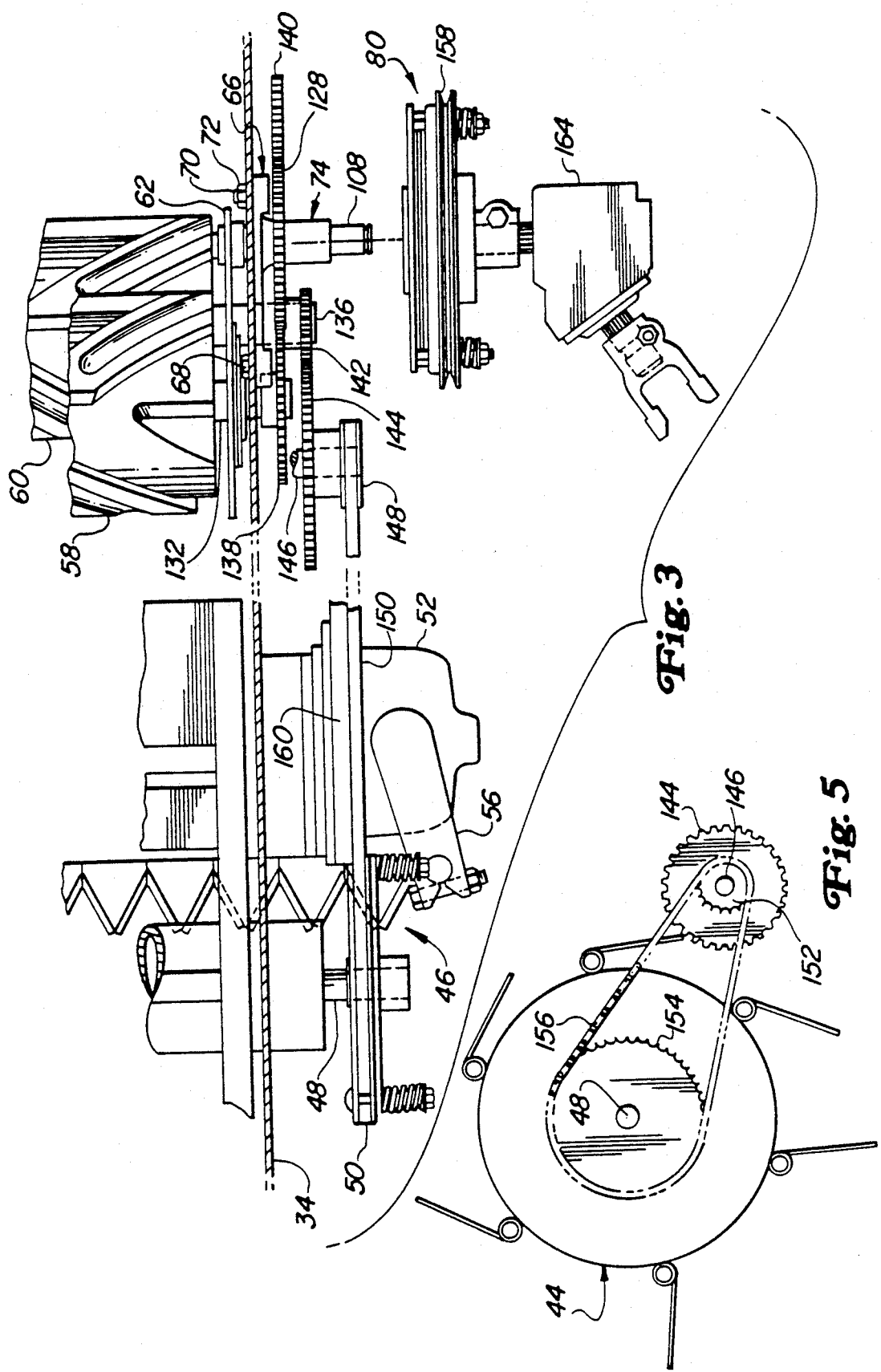
FIG. 3 is a top view of the drive system shown in FIG. 1.

Referring now also to FIGS. 2 and 3, located ahead of the main frame 12 is a header 30 including a frame 32 having opposite end structures including spaced upright side walls or sheets 34 having upper rear locations interconnected by a tubular cross member 36. The header 30 is suspended from the main frame 12 by a four-bar linkage comprising a centrally located upper link 38 coupled between the cross members 18 and 36 and a pair of laterally spaced lower links 40 connected between respective ones of the wheel support arms 22 and the end structures of the header frame 32. Provided for counter balancing the weight of the header 30 are a pair of spring assemblies 42 respectively coupled between opposite ends of the main frame 12 and opposite ends of the header frame 32.

The header includes a crop severing device comprising a reel 44 and a sickle-type cutterbar 46, each extending between the header side walls 34 with the reel including a central shaft 48 rotatably mounted in the walls and carrying a reel driven sheave 50 at its left end and with the cutterbar 46 being supported by the end structures of the header frame 32 and including a wobble box 52 supporting an input shaft to which is mounted a cutterbar driven sheave 54 and supporting an output shaft to which is mounted a sickle drive arm 56.

The header also includes a crop conditioning device comprising upper and lower conditioner rolls 58 and 60 positioned between the header side walls 34 at a location rearwardly of the cutterbar 46 such that the reel 44 will sweep cut crop into a nip defined by the rolls. Specifically, the lower conditioner roll 60 has opposite ends respectively rotatably mounted in the opposite side walls 34 while the upper roll 58 has its opposite ends mounted to respective forward locations of a pair of roll support arms 62 that are respectively vertically pivotally mounted to the side walls 34, whereby the upper rolls 58 are swingable towards and away from the lower rolls 60 so as to accommodate different crop mat thicknesses fed between the rolls.

Figure 4:
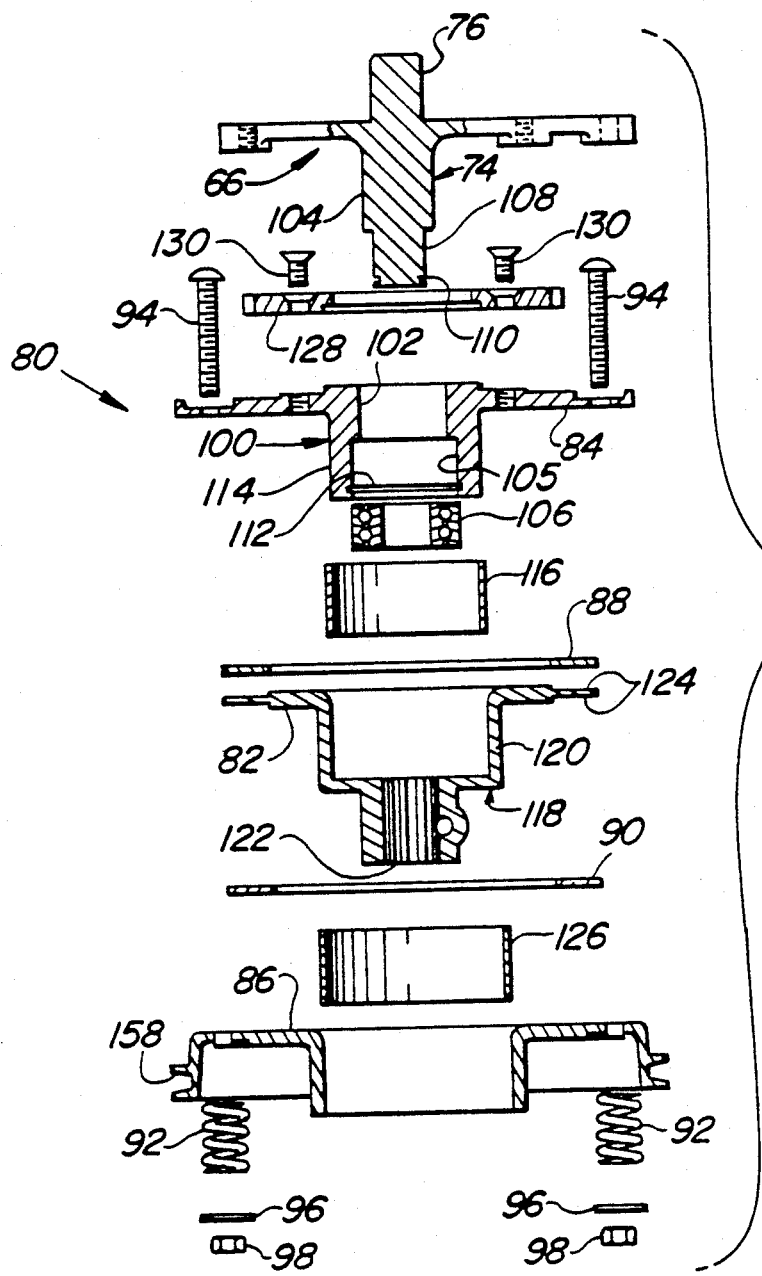
FIG. 4 is an exploded view of the main drive slip clutch.

Finally, the header includes a drive system 64 for powering the reel 44, cutterbar 46 and the upper and lower conditioner rolls 58 and 60. Specifically, referring now also to FIGS. 2-4, the drive system 64 includes a triangular-shaped, main support casting 66 oriented so as to have upper front and rear corners and a lower rear corner with the upper front and rear corners being provided with threaded holes receiving bolts 68 securing the casting to the left side wall 34 and with the lower rear corner containing a throughbore in which a reduced-diameter end idler shaft 70 is pressed, the shaft having a nut 72 threaded onto its inner end. Formed as an integral part of the support casting 66 is an outwardly projecting stub shaft 74 and an inwardly projecting pivot pin 76, the latter extending through a hole provided in the left side wall 34. While the shaft 74 and pin 76 are shown as being integral parts of the casting 66, they could be made separate from the main casting and pressed into an opening provided in the casting. The stub shaft 74 and the pivot pin 76 are both located along the pivot axis of the roll support arms 62 and the left roll support arm is mounted for pivoting about the pin 76. Mounted for rotation about the stub shaft 74 is a main drive slip clutch 80 comprising a main drive plate 82 located between an inner pressure plate 84 and an outer pressure plate 86, with a first friction disc 88 being located between an inner face of the drive plate and the inner pressure plate and with a second friction disc 90 being located between an outer face of the drive plate and the outer pressure plate. The inner and outer pressure plates 84 and 86 are spring biased towards each other and drive plate 82 by means of a plurality of coil compression springs 92 respectively received on outer ends of a plurality of bolts 94 extending outwardly through aligned sets of holes provided in circular, equispaced pattern located in the inner and outer pressure plates. Each of the bolts has washer 96 received thereon which is urged against a respective spring 92 by means of a nut 98 threaded onto the bolt. It is here noted that while a set of eight bolt mounting holes are provided in the inner and outer pressure plates 84 and 86, only four springs 92 are required for transmitting the amount of torque required for driving the sickle-type cutterbar 46 without slippage. However, for other applications described below, four additional springs 92 are required for torque transmission.

For mounting the clutch onto the stub shaft 74, the inner pressure plate 84 is provided with a hub 100 having an inner small inside diameter section 102 loosely received about a large inner diameter section 104 of the shaft 74. The hub 100 has an outer large inside diameter section 105 in which is received an outer race of a double-row bearing 106, an inner race of the bearing being received on a small outer diameter section 108 of the shaft 74. A first snap ring (not shown) is received in an annular groove 110 provided in the outer end of the shaft 74 and engages an outer face, of the inner race of the bearing 106 so as to hold the latter positioned against a shoulder defined by the shaft section 104 while a second snap ring (not shown) is received in an annular groove 112 provided at the outer end of the large inside diameter section 105 of the hub 100 and engages an outer face of the outer race of the bearing. The hub 100 has a cylindrical outer surface 114 on which is received a bushing 116. The drive plate 82 includes a hub 118 having an inner large inside diameter section 120 rotatably mounted on the bushing 116 and includes an outer small inside diameter section 122 which is splined for a purpose explained below. An outer peripheral portion of the drive plate has annular recessed portions 124 on opposite faces thereof and the inner and outer friction discs 88 and 90 are received against these portions. A second bushing 126 is received on a large cylindrical outer surface of the hub 118 and the outer pressure plate 86 is rotatably mounted on the bushing 126.

A spur gear drive train is provided for coupling the slip clutch 80 to the conditioner rolls 58 and 60. Specifically, coupled for rotation together with the inner pressure plate 84 is a main drive gear 128 which is secured to the inner surface of the plate 84 by a plurality of screws 130 which extend through the gear and are screwed into threaded holes provided in the plate 84. The left end of the upper roll 58 is defined by a shaft 132 extending through a vertically elongated clearance opening (not shown) provided in the left side wall 34 and carrying an upper roll drive gear 134 meshed with the main drive gear 128. Thus, it will be appreciated that, because the roll support arms 62 pivot about the axis of the main drive gear, the mesh between the gears 128 and 134 will be maintained as the upper roll 58 moves up and down during operation. The lower conditioner roll 60 has a left end defined by a shaft 136 which extends through the left side wall 34 and carries a lower roll drive gear 138. The main drive gear 128 is coupled for driving the lower roll by means of an idler gear 140 which is rotatably mounted on the idler shaft 70 and meshed both with both the main drive gear 128 and the lower roll drive gear 138. A reel drive gear 142 is mounted on the roll shaft 136 outboard of the drive gear 138 and is meshed with a reel drive jackshaft gear 144 mounted to an outer end of a reel drive jackshaft 146 which is rotatably supported by the header frame end structure. A reel drive belt sheave or pulley 148 is mounted to an inner end of the jackshaft 146 and is coupled to the reel driven sheave 50 by a reel drive belt 150. As can be seen in FIG. 5, a reel drive sprocket 152 and a reel driven sprocket 154 could respectively be substituted for the reel drive sheave 148 and the reel driven sheave 50 and interconnected by a reel drive chain 156.

A cutterbar drive sheave or pulley 158 is formed as an integral part of the outer pressure plate 86 and is coupled to the driven cutterbar sheave 54 by a cutterbar drive belt 160. It is here noted that the sheave 158 is provided with but a single groove but that a different sheave having multiple grooves could be substituted for applications requiring the transmission of additional torque, one such application being described below.

The clutch 80 receives its power from the PTO shaft of a towing tractor (not shown), such power being delivered to the clutch via a driveline 162 carried by the draft tongue and an angle gear box 164 having a first splined shaft releasably coupled to a rear end of the driveline 162 and a second splined shaft releasably received in the splined outer section 122 of the drive plate hub 118. The gear box 164 contains a pair of meshed bevel gears designed to effect a ratio of about 1.35:1 whereby the gear box may be reversed so as to maintain an output speed of about 735 rpm regardless of whether the tractor supplying the power has a PTO operating at 740 rpm or at 1000 rpm.

Thus, it will be appreciated, that the slip clutch 80 acts to divide the power flow to the cutterbar wobble box 52 and the conditioner rolls 58 and 60 together with the reel 44 and that, due to the main drive gear 128 and the cutter bar drive sheave 158 being respectively fixed and/or formed for rotation together with the inner and outer pressure plates 84 and 86 of the clutch and the close-coupling of the gears to the upper and lower conditioning rolls, the drive system is quite compact in the lateral direction so as to result in an overall shortening of the width of the machine from that of the prior art machine described above which has a gear train contained within an enclosed gear case having output shafts respectively coupled to the upper and lower conditioner rolls through shafts including u-joints.

Figure 6:
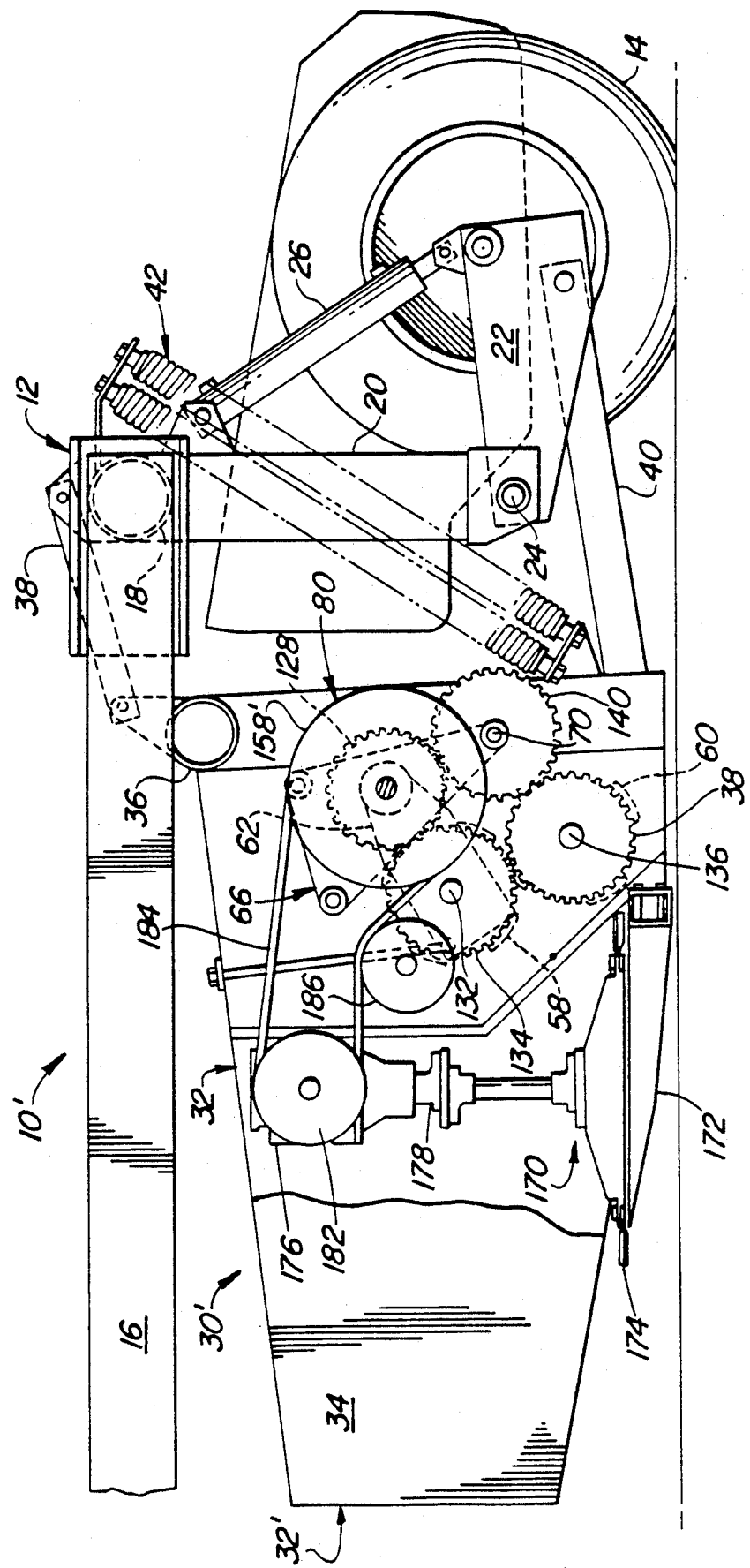
FIG. 6 is a left side elevational view of the drive system of a mower-conditioner equipped with a rotary type cutterbar and conditioner rolls.
Figure 7:
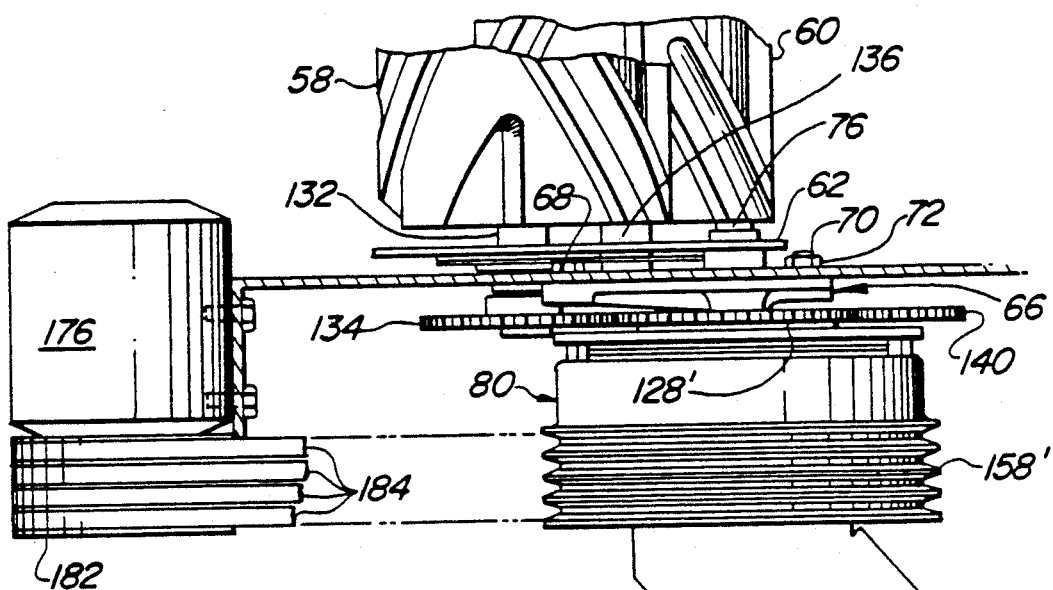
FIG. 7 is a top plan view of the drive system of FIG. 6.

Referring now to FIGS. 6 and 7, there is shown a mower-conditioner 10' which differs from the above-described mower-conditioner 10 in that it is equipped with a crop severing device in the form of a rotary cutterbar 170 instead of in the form of a sickle-type cutterbar and reel. Specifically, the cutterbar 170 includes a header 30' having a transverse cutterbar gear housing 172 extending between and fixed to the opposite end structures of a frame 32' of the header. A plurality rotary cutting units are spaced along the gear housing 172, with only the leftmost cutting unit 174 being shown. Supported by the frame 32' at a location above the cutting unit 174 is a cutterbar gear box 176 having a downwardly extending output shaft 178 coupled for driving an input shaft 180 of the cutterbar, the input shaft serving also as the drive shaft for the cutting unit 174. Power is delivered lengthwise of the cutterbar gear housing by a gear train (not shown) contained therein and including a plurality of idler gears and disc drive pinion gears. The gear box 176 also has an outwardly projecting input shaft having a cutterbar driven sheave or pulley 182 mounted thereon and coupled to a cutterbar drive sheave or pulley 158' forming an integral part of the outer pressure plate 86 of the slip clutch 80, the pulley 158' differing from the pulley 158 in that it has more belt grooves whereby the additional torque necessary for driving the cutterbar 170 can be transferred thereto. Also, it is here noted that because additional torque is required to be transferred all eight of the clutch springs 92 are used for biasing the inner and outer pressure plates 84 and 86 towards each other and the main drive plate 82. A plurality of drive belts 184 are connected between the sheaves 158' and 182, the belts passing over an idler pulley 186. An angle gear box 164', which is similar to the above-described angle gear box 164 except for having a larger bevel gear set for carrying the extra torque required for driving the rotary cutterbar 170. The remainder of the drive system, i.e., the spur gear drive train for driving the upper and lower conditioner rolls 58 and 60 is like that described above.

Figure 8:
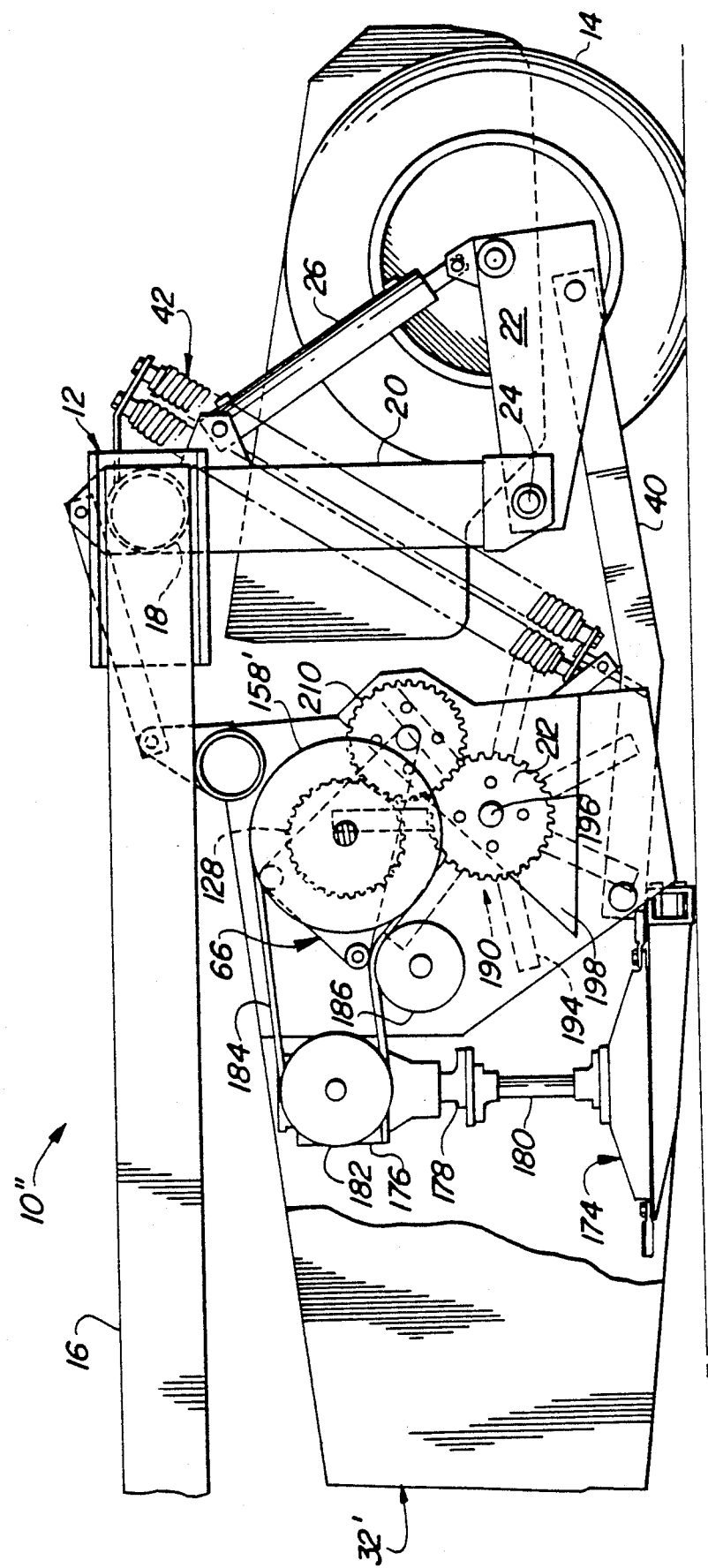
FIG. 8 is a left side elevational view like FIG. 6 but showing the mower-conditioner equipped with an impeller conditioner.
Figure 9:
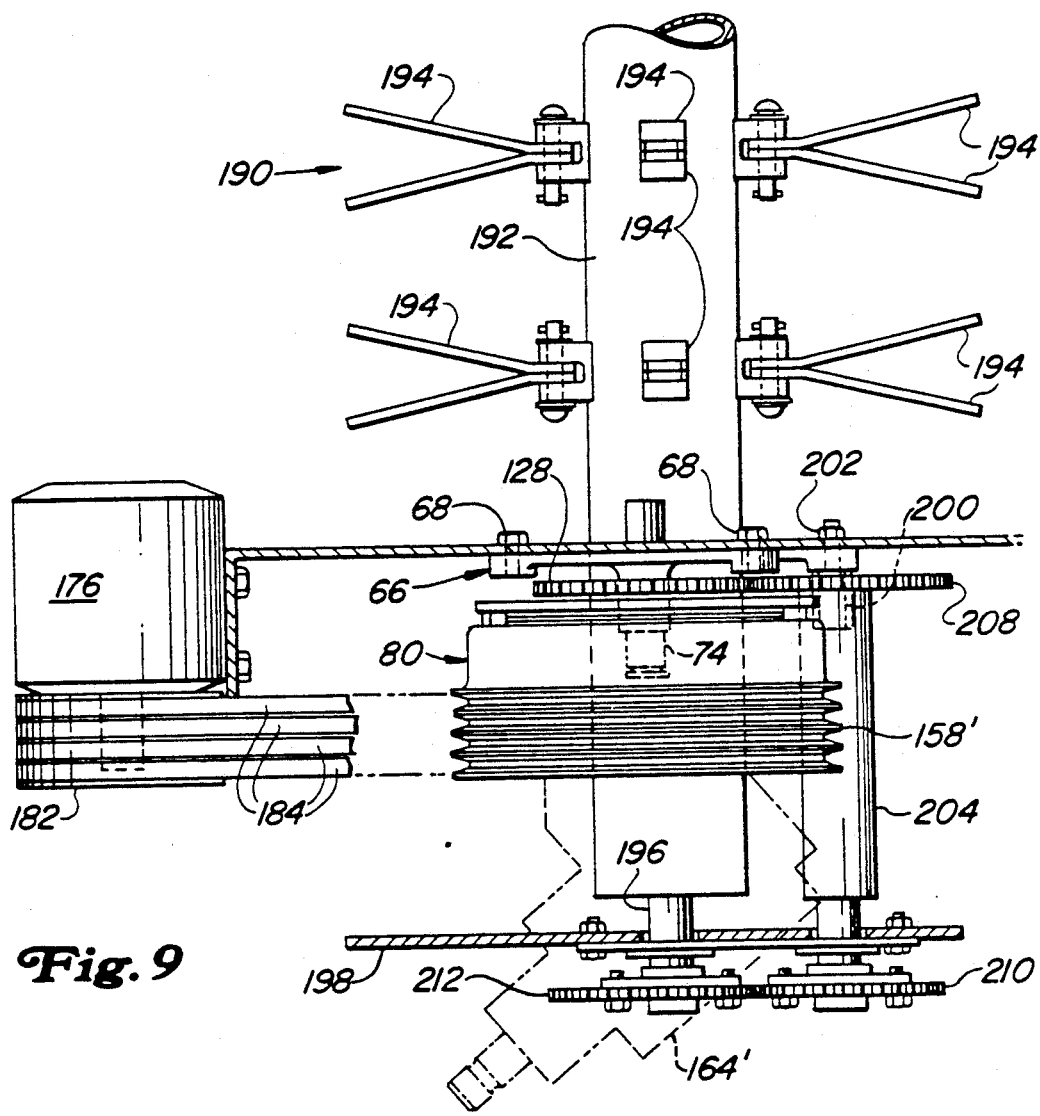
FIG. 9 is a top plan view of the drive system of FIG. 8.

Referring now to FIGS. 8 and 9, there is shown a mower-conditioner 10" which is like the above-described mower-conditioner 10' except that instead of being equipped with a roll conditioner device it is equipped with an impeller conditioner device including an impeller 190 comprising a central tube 192 having a plurality of blades 194 pivotally mounted to the tube 192 at spaced locations along the length of the tube. The left end of the tube 192 extends through a hole provided in the left side wall 34 and has an end shaft 196 fixed thereinside and projecting through an outer triangular shaped upright wall section 198 in which it is rotatably mounted by a bearing. The main support casting 66 is mounted to the side wall 34 so as to be above the area of mounting shown in the embodiment shown in FIGS. 6 and 7 and such that the lower rear corner of the casting is further rearwardly than it is in the previously describe embodiment. An idler shaft support stub shaft 200 having a threaded inner end is received through the bore in the lower rear corner of the casting 66 and has a nut 202 received thereon. It is here noted that the shaft 200 is the same as the idler shaft 70 described above but is here given a separate reference number because of the different function it performs. An idler shaft 204 has an axial bore provided in its inner end and a needle bearing (not shown) rotatably supports the inner end of the shaft 204 on the stub shaft 200. The outer end of the idler shaft 204 is rotatably mounted in the outer upright wall section 198. Mounted to an inner end of the idler shaft 204 for rotation therewith is an inner idler gear 208 which is meshed with the main drive gear 128 and mounted to an outer end of the idler shaft 204 is an outer idler gear 210 meshed with an impeller drive gear 212 mounted to the outer end of the impeller end shaft 196.

Thus, it will be appreciated that the main support casting 66 and the slip clutch 80 can be used with a variety of mower-conditioner machines equipped with various crop severing and conditioning devices with the only structural change to those elements being that for rotary cutterbar machines it is necessary to substitute an outer clutch pressure plate having an integral sheave that is provided with additional belt grooves and to add additional springs clutch springs 92 along with the associated mounting bolts and nuts as is necessary for transmitting the additional torque required for driving the rotary cutterbar.

We claim:

1. In a mower-conditioner header including a support frame having transversely spaced end structures supporting crop severing and conditioning devices extending therebetween and a drive system for the crop severing and conditioning devices, the improvement comprising: said drive system including a stub shaft fixed to and projecting outwardly from an upright wall section of one of the end structures; a main drive slip clutch supported by and mounted for rotation about said stub shaft; said clutch including inner and outer pressure plates located on opposite sides of a main drive plate and biased towards each other by spring means connected therebetween; a first drive element being joined for rotation together with said inner pressure plate; a first drive connection between the first drive element and the crop conditioning device; and a second drive element being joined for rotation together with said outer pressure plate; and a second drive connection between the second drive element and the crop severing device.

2. The mower-conditioner header defined in claim 1 wherein said first drive element is a main drive spur gear; and said first drive connection including a first conditioner drive gear constituting the sole drive connection between the main drive spur gear and a first crop conditioning element of the crop conditioning device.

3. The mower-conditioner header defined in claim 1 or 2 wherein said second drive element is a first belt sheave; and said second drive connection including a second belt sheave forming part of said crop severing device and being coupled to the first belt sheave by at least one drive belt.

4. The mower-conditioner header defined in claim 1 wherein said crop conditioner device includes upper and lower conditioner rolls; a pair of roll support arms being vertically pivotally mounted to the frame end structures for movement about a horizontal transverse axis located along said stub shaft; said first drive element being a main drive spur gear; said first drive connection comprising an upper roll drive gear mounted to an end of the upper conditioner roll and meshed with said main drive spur gear, an idler gear meshed with said main drive spur gear and a lower roll drive gear mounted to an end of the lower conditioner roll and meshed with the idler gear.

5. The mower-conditioner header defined in claim 4 wherein a main support casting is releasably secured to said upright wall section by a plurality of bolts; said stub shaft being supported by said main support casting; and one of said plurality of bolts being elongated and having said idler gear mounted thereon for rotation thereabout.

6. The mower-conditioner header defined in claim 5 wherein said stub shaft is formed integrally with said main support casting.

7. The mower-conditioner header defined in claim 5 wherein a pin is supported by said main support casting and projects inwardly through said upright wall section along said axis; and one of said roll support arms being mounted for pivoting about said pin.

8. The mower-conditioner header defined in claim 7 wherein said pin is formed integrally with said main support casting.

9. The mower-conditioner header defined in claim 4 wherein said crop severing device includes a reel having a central shaft having its opposite ends rotatably supported by said end structures of the frame and a driven reel sheave being connected to an end of said central shaft; a reel drive gear being mounted to the lower conditioner roll at a location outboard of the lower roll drive gear; a reel drive jackshaft being rotatably supported by said one of the end structures at a location forwardly of the lower conditioner roll; and a reel jackshaft gear and a reel drive sheave being carried by the jackshaft with the reel jackshaft gear being meshed with said reel drive gear and with the reel drive sheave being connected to the driven reel sheave by a belt.

10. The mower-conditioner header defined in claim 4 wherein said crop severing device includes a reel having a central shaft rotatably supported at its opposite ends by said end structures of the frame and having a driven reel chain sprocket connected to an end thereof; a reel drive gear mounted to the lower conditioner roll at a location outboard of the lower roll drive gear; a reel drive jackshaft being rotatably supported by said one end structure at a location forwardly of the lower conditioner roll; a reel jackshaft gear mounted to the reel jackshaft and meshed with said reel drive gear; and a reel drive chain sprocket mounted to the reel jackshaft and coupled to the reel driven sprocket by a drive chain.

11. The mower-conditioner header defined in claim 1 wherein first drive element is a main drive spur gear; said crop conditioner device including an impeller conditioner having an impeller drive gear mounted on one end of a rotor thereof; and said first drive connection including an idler shaft supported for rotation by said one end structure of the frame and carrying an inner idler gear meshed with said main drive spur gear and an outer idler gear meshed with said impeller drive gear.

12. The mower-conditioner header defined in claim 11 wherein a main support casting is secured to said upright wall section by a plurality of bolts; said stub shaft being supported by said main support casting; one of said bolts being elongated and having an inner end of said idler shaft rotatably mounted thereon; and said one end structure of the support frame including a second upright wall section rotatably supporting an outer end of said idler shaft.

13. The mower-conditioner header defined in claim 1 and further including an angled gear box supporting first and second shafts interconnected by bevel gearing; and said main drive plate of the clutch having a releasable splined connection with one of the shafts while the other shaft is adapted for connection with a drive line coupled to a tractor PTO.

14. The mower-conditioner header defined in claim 13 wherein said angled gear box contains gearing establishing a drive ratio between the first and second shafts such that the gear box may be reversed for establishing substantially the same speed of rotation at the shaft coupled to the main drive plate of the clutch regardless of whether the tractor PTO is operating at 540 rpm or 1000 rpm.

* * * * *